United States Patent
Lakic et al.

(10) Patent No.: US 9,555,839 B2
(45) Date of Patent: Jan. 31, 2017

(54) VEHICLE JACKING POINT AND REINFORCING INSERT

(71) Applicant: Jaguar Land Rover Limited, Whitley Coventry Warwickshire (GB)

(72) Inventors: Alex Lakic, Wellesbourne (GB); Mark Maher, Hatton Park (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 27 days.

(21) Appl. No.: 14/425,033

(22) PCT Filed: Sep. 6, 2013

(86) PCT No.: PCT/EP2013/068521
§ 371 (c)(1),
(2) Date: Feb. 28, 2015

(87) PCT Pub. No.: WO2014/037537
PCT Pub. Date: Mar. 13, 2014

(65) Prior Publication Data
US 2015/0246693 A1    Sep. 3, 2015

(30) Foreign Application Priority Data
Sep. 6, 2012    (GB) .................................. 1215914.1

(51) Int. Cl.
*B60S 11/00*    (2006.01)
*B62D 25/20*    (2006.01)
(Continued)

(52) U.S. Cl.
CPC ............ *B62D 25/2081* (2013.01); *B60S 11/00* (2013.01); *B62D 21/18* (2013.01); *B62D 29/008* (2013.01)

(58) Field of Classification Search
CPC ... B62D 25/2081; B62D 21/18; B62D 29/008; B60S 11/00
(Continued)

(56) References Cited

U.S. PATENT DOCUMENTS 5,161,782 A * 11/1992 Huang ..................... B66F 3/12
                                                        254/126
5,362,121 A    11/1994 Enning et al.
(Continued)

FOREIGN PATENT DOCUMENTS

CN       1663866 A      9/2005
CN     101722991 A      6/2010
(Continued)

OTHER PUBLICATIONS

Notice of Reasons for Rejection, in Japanese with English summary, corresponding to JP application No. 2015-530422, dated Mar. 22, 2016, 11 pages.
(Continued)

*Primary Examiner* — Jason S Morrow
*Assistant Examiner* — E Turner Hicks
(74) *Attorney, Agent, or Firm* — Reising Ethington P.C.

(57) ABSTRACT

An extruded aluminum section insert, for use as a vehicle jacking point, comprises an inside wall spaced apart from an outside wall and adapted to abut internal side walls of a vehicle sill box structure. It has a floor wall and a ceiling wall, each spanning the gap between the side walls and connecting thereto. One or more reinforcing fillet walls interconnect either the floor and ceiling walls, between the inside and outside walls, or vice versa. A depending flange from the floor wall, on the underneath, opposite side thereof from the inside and outside walls and ceiling wall, provides the jacking point. The depending flange is adapted to be engaged by a jack and transmit vehicle weight loads through
(Continued)

the floor wall, into the inside, outside and ceiling walls and to the side walls of the sill when connected thereto. Said adaptation comprises sufficient strength for the intended load and means to positively engage with the jack to prevent slippage of the jack in a transverse direction with respect to the floor wall. A vehicle comprising said insert is described, comprising a box structure sill on each side of the vehicle between front and rear wheels. The sill is reinforced by the section disposed within the sill, the depending flange extending through a slot in a floor wall of the sill, whereby the flange provides at least one jacking point on either side of the vehicle.

15 Claims, 3 Drawing Sheets

(51) Int. Cl.
    *B62D 29/00*     (2006.01)
    *B62D 21/18*     (2006.01)

(58) Field of Classification Search
    USPC ........................ 296/193.07, 209, 30
    See application file for complete search history.

(56) References Cited

U.S. PATENT DOCUMENTS

| | | | |
|---|---|---|---|
| 5,609,004 | A | 3/1997 | Kreis |
| 6,022,001 | A * | 2/2000 | Palacio .............. B66F 3/12 |
| | | | 254/126 |
| 6,053,564 | A | 4/2000 | Kamata et al. |
| 6,619,622 | B1 * | 9/2003 | Alten .............. B60S 11/00 |
| | | | 254/126 |
| 7,147,272 | B2 | 12/2006 | Odaka et al. |
| 8,011,721 | B2 | 9/2011 | Yamada et al. |
| 2003/0122364 | A1 * | 7/2003 | Muramatsu ........... B60R 13/04 |
| | | | 280/851 |
| 2007/0029842 | A1 * | 2/2007 | Gade ................ B62D 25/2081 |
| | | | 296/209 |
| 2010/0109385 | A1 | 5/2010 | Yamada et al. |
| 2012/0248825 | A1 | 10/2012 | Tamura |

FOREIGN PATENT DOCUMENTS

| | | | |
|---|---|---|---|
| DE | 2803504 | A1 | 8/1979 |
| DE | 102004027175 | A1 | 1/2006 |
| DE | 102010025787 | A1 | 3/2011 |
| DE | 102010025787 | A * | 11/2013 |
| EP | 0825096 | A2 | 2/1998 |
| EP | 1840003 | A2 | 10/2007 |
| EP | 1880924 | A2 | 1/2008 |
| EP | 2014539 | A1 | 1/2009 |
| JP | H1059218 | A | 3/1998 |
| JP | 2001347967 | A | 12/2001 |
| JP | 2006168594 | A * | 6/2006 |
| JP | 2006168594 | A | 6/2006 |
| JP | 2006224702 | A | 8/2006 |
| JP | 2010105587 | A | 5/2010 |
| JP | 2012111246 | A | 6/2012 |
| WO | 2005118373 | A1 | 12/2005 |
| WO | WO2011077808 | A1 | 6/2011 |

OTHER PUBLICATIONS

Chinese Office Action in Chinese corresponding to CN application No. 201380054423.5, dated Apr. 5, 2016, 22 pages.
International Search Report for application No. PCT/EP2013/068521, dated Apr. 11, 2014 , 7 pages.
UK Combined Search and Examination Report for corresponding application No. 1215914.1, dated Dec. 21, 2012, 9 pages.
Written Opinion for application No. PCT/EP2013/068521, dated Apr. 11, 2014, 13 pages.

* cited by examiner

US 9,555,839 B2

VEHICLE JACKING POINT AND REINFORCING INSERT

TECHNICAL FIELD

This invention relates to a jacking point for a vehicle, especially a passenger vehicle such as a car, more particularly, a sports utility vehicle (SUV), and in particular to a reinforcing insert for such a jacking point.

BACKGROUND

Due to concerns over fuel use, it has become imperative for automotive manufacturers to adopt an ecologic mindset. In this mindset efficiency plays a predominant role when developing new vehicle systems. A new car must waste as little fuel as is practical. Hence it is important to increase the mileage that the car achieves, and so reduce the cost of running the vehicle and its environmental impact.

One particular aspect of fuel usage is vehicle weight. Cost effective means of reducing vehicle weight, without compromising other aspects such as strength, or longevity are desirable, increasingly, aluminium and aluminium alloys are being used to make vehicle body panels and other components of the vehicle.

A problem with all cars is the provision of suitable points at which a vehicle jack can be applied to lift the vehicle, most typically when a wheel is to be replaced. While jacks used in garages are frequently large in terms of the surface area that they occupy, whereby the load on the vehicle is spread over a wide area, such is not the case with on-board jacks that are carried in the car and which vehicle owners use in emergency situations when they need to change a wheel following a tyre puncture. Such jacks need to be email and compact, so that they can be stored in the vehicle in convenient locations without occupying a lot of space, or indeed, themselves representing a substantial load.

Typically, such jacks are provided with a male or female lifting component designed to engage with a corresponding male or female component disposed under the vehicle, in perhaps four locations, one adjacent each wheel around the vehicle, often in or under the side sills of the vehicle. Vehicle sills, like many structural components of a vehicle body, are box structures formed by two or more panels welded together along seams. A frequent arrangement is for the seam itself to form a location for engagement by a jack because the seam is a double layer of the panel material. The panel material itself is almost certainly too weak to support the weight of the vehicle on a small jack head, at least when loaded in a flexing mode of the panel. In a shear mode, however, panels are much stronger and of course sill seams tend to be downwardly directed so that loading the seam tends to be in shear mode anyway. However, even a double layered seam, in shear mode of loading, is most likely still too weak to accept the weight of the entire vehicle on a small jack head. Frequently a third panel piece is connected to the sill wall, perhaps welded between the sill panels in the seam, to reinforce the sill, or rather especially the sill seam, where the jack is intended to engage.

Vehicle sills are inevitably vulnerable to corrosion being located only a few centimeters off the road surface. They are subject to spray from the road in use. Sills are formed during construction of the car body shell up to the eponymous "Body in White" stage of vehicle manufacture, at which stage much of the metal protection systems are applied before assembly of the final car begins. Special coatings and treatments may be applied to such areas as the sills and in many cars sills remain "wet" during life of the vehicle, meaning that they are not sealed and are exposed (internally and externally) to the environment. Consequently, water is frequently entrained within the sills and, especially in winter, salt water from salted roads can commence galvanic corrosion, indeed, this can continue into the summer because, although the sills may be wet, as just described, they do not drain easily and are not flushed out, so that salt can linger. Galvanic corrosion is a particularly aggressive form of corrosion that surface coatings guard against. Even so, stone chips can soon undermine such coatings, so avoiding galvanic corrosion as much as possible is desirable. Galvanic corrosion is caused by employing different metals.

As mentioned above, aluminium is replacing steel as a material of choice. However, aluminium needs to be much thicker than steel to achieve a comparable strength. Aluminium is also not capable of being worked in the same way as steel without compromising strength and, unlike steel, cannot be bent into sharp corners.

One particular form of sill reinforcement for a jacking point in a steel vehicle is a steel box comprising a floor with an aperture, an upstanding back wall and depending side walls that act as reinforcing fillets between the floor and back wall. The back wall and floor are to a side wall and base wall of the sill respectively. A plastic or rubber bung is inserted in the aperture (through a mating aperture of the sill base wall) to provide a jacking point. Such an arrangement is perfectively satisfactory, but it is heavy. Moreover it could not be used in an aluminium-bodied vehicle, especially in a wet zone, without inevitably causing a serious galvanic corrosion problem.

It is an object of the present arrangement to provide a sill reinforcement for the jacking point of a vehicle that does not suffer from, or at least mitigates some of the effects of, the aforementioned issues.

BRIEF SUMMARY OF THE INVENTION

According to an aspect of the present invention there is provided an extruded aluminium section insert for insertion within a body structure of a vehicle and for use therein as a vehicle jacking point comprising:
  a side wall adapted to abut an internal side wall of a vehicle sill box structure in use;
  a floor wall connected to the side wall and adapted to abut a floor wall of a vehicle sill box structure in use;
  a depending flange from the floor wall on the underneath, opposite side thereof from the side wall;
  wherein the depending flange is adapted to be engaged by a jack and transmit vehicle weight loads through the floor wall, into side wall to the side wall of the sill when connected thereto.

According to another aspect of the present invention there is provided an extruded aluminium section insert for insertion within a body structure of a vehicle and for use therein as a vehicle jacking point comprising:
  an inside wall spaced apart from an outside wall and both the inside wall and the outside wall adapted to abut internal side walls of a vehicle sill box structure;
  a floor wall and ceiling wall each spanning the gap between the side walls and connecting thereto;
  one or more reinforcing fillet walls interconnecting either the floor and selling walls between the inside and outside walls or vice versa;
  a depending flange from the floor wall on the underneath, opposite side thereof from the inside and outside walls and ceiling wall, wherein the depending flange is adapted to be engaged by a jack and transmit vehicle weight loads through the floor wall into the inside, outside and ceiling walls and to the side walls of the sill when connected thereto, said adaptation comprising sufficient strength for the intended load.

According to another aspect of the present invention there is provided an extruded aluminium section insert for use as a vehicle jacking point comprising:

an inside wall spaced apart from an outside wall and both the inside wall and the outside wall adapted to abut internal side walls of a vehicle sill box structure;

a floor wall and ceiling wall, each spanning the gap between the side walls and connecting thereto;

one or more reinforcing fillet walls interconnecting either the floor and ceiling walls between the inside and outside walls or vice versa;

a depending flange from the floor wall on the underneath, opposite side thereof from the inside and outside walls and ceiling wall, wherein the depending flange is adapted to be engaged by a jack and transmit vehicle weight loads through the floor wall, into the inside, outside and ceiling walls and to the side walls of the sill when connected thereto, said adaptation comprising sufficient strength for the intended load.

Embodiments of the invention also provide a vehicle comprising a box structure sill on each side of the vehicle between front and rear wheels, wherein the sill is reinforced by an extruded aluminium section, the aluminium section being at least partially enclosed by the sill and comprising a depending flange of the section that extends through a slot in a floor wall of the sill whereby the flange provides at least one jacking point for the vehicle and the weight load of the vehicle is transmitted from the vehicle, through the sill, into the section and onto a jack through said flange.

According to a further aspect of the present invention there is provided a vehicle comprising a box structure sill on each side of the vehicle between front and rear wheels, wherein the sill is reinforced by an extruded aluminium section, disposed within the sill and comprising a depending flange of the section that extends through a slot in a floor wall of the sill, whereby the flange provides at least one jacking point for the vehicle and the weight load of the vehicle is transmitted from the vehicle, through the sill, into the section and onto a jack through said flange.

The vehicle may employ the section as defined above. The aluminium section may be substantially or completely enclosed by the sill section.

When the term "aluminium" is used herein, what is meant is any extrudable metal, whether aluminium or aluminium containing alloy, out of which it is feasible to build at least some structural components of a passenger carrying motor vehicle. A range of suitable alloys comprise the AA6000 series which are aluminium/magnesium/silicon alloys, of which one is AA6082T6, a possible candidate for the present application.

Conveniently, said flange further comprises means to positively engage with the jack to prevent slippage in a transverse direction with respect to the floor wall.

Aluminium presently employed in vehicle construction is not as strong as steel and whereas steel panels can be as little as 1 or 2 mm thick and still form constructional components, at least when formed into box-like, three-dimensional constructions, aluminium needs to be 3 or 4 mm thick by comparison. Moreover, welding aluminium tends to destroy what additional strength characteristics it can be given by thermal treatments. The preferred method of joining aluminium panels in vehicle construction is by riveting. Currently, there are two primary modes of riveting: self-piercing and pre-drilled, each having its advantages. Self-piercing is most desired because, in manufacturing terms, it is quick to employ and requires little precision. Two metal components to be joined are temporarily held together in a jig and a rivet is driven at high speed through the components which plastically deform on impact. However, that also states the disadvantage, in that the component must be held in a jig that supports the components and prevents wider deformation of the components during the riveting process. Pre-drilled riveting obviously involves drilling the components prior to riveting but it has the advantage that forming the rivet has the effect of drawing the components together so that, provided they are approximately positioned, riveting can be achieved from one side.

From the foregoing, it will be appreciated that the section of the invention cannot obviously be pierce-riveted to the sill, it would appear that sufficient support is unlikely to be able to be provided to its walls, at least from within the space defined between its walls, to support pierce-riveting. In one embodiment, the section has at least one flange that is a cantilevered extension of one of the side walls, whereby the section may be secured to the sill walls by self-piercing rivets through the flange.

Another embodiment of the invention comprises the ends of the extruded section having been machined to remove end parts of the section while retaining an extension of the inside wall and floor whereby said inside wall extension and floor extension may be pierce-riveted to corresponding walls of the sill.

Optionally, said depending flange is also machined to remove end parts thereof and the slot is shorter in length than the section, whereby the weakening effect of the slot in the sill may be mitigated by the connection of the floor extension to the floor wall of the sill at either end of the slot.

Optionally, in section, the depending flange comprises a relatively thick end-nose and two upstanding flange walls from the nose that diverge from each other until they meet the floor of the section. The flange walls may continue to diverge beyond said floor where they constitute fillets of the section intermediate the inside and outside walls that evolve from the floor laterally displaced from the flange walls. Optionally, the fillets continue to diverge until an inside one of them meets the inside wall, whereby loads imposed on the nose by a jack lifting the vehicle are transferred smoothly to the inside wall of the section, and thence to the remainder of the vehicle.

Said means to positively engage the jack may comprise nothing more than vertical surfaces, that is to say, orthogonal surfaces with respect to the floor wall when in use, of the flange whereby corresponding surfaces of the jack can engage said vertical surfaces and prevent lateral movement of the flange with respect to the jack. The vertical surfaces may have components that are orthogonal with respect to each other, so that said prevention of lateral movement is omnidirectional, at least in the horizontal plane.

References herein to components of the invention that are "vertical" and "horizontal" mean with respect to gravity when the vehicle in which the section is properly fitted is positioned normally on horizontal flat ground. Words such as "above", "below", "beside", "underneath" etc should be construed accordingly.

The flange nose may be curved in the section of extrusion, whereby it offers the possibility of rolling (or possibly sliding) rotation of the flange about an axis parallel the flange when the flange is supported on the jack and the jack is operated to tilt the vehicle about an axis along the ground through the wheels in contact, with the ground on the far side of the vehicle from which the jack is operating. Normally, if there are four jacking points, the suspension of the vehicle has the effect of tiling the axis of vehicle rotation, but this effect, is negligible.

The flange may be of female form. That is, it may have an inverted Y-section whereby a male component of the jack locates in the crook of the Y-flange and that, crook may be curved to facilitate said rolling/sliding rotation.

A central notch may be provided in the flange, for cooperation with a dog (for example an re-shaped dog, provided on the jack, whereby said omnidirectional location of the jack with respect to the flange can be assured. In that event, the ends of the flange may be rounded so that the depending flange is damaged less by rock contacts etc.

Said outside wall of the section may be pre-drilled and not provided with a flange. The reason for this may be that pierce-riveting is not an option for connecting both sides of the section to both walls of the sill. Rather, it is possible to connect the section to the inside wall of the sill and the floor wall of the sill, by pierce-riveting through said extensions, before construction of the sill is completed. After completion of the sill (which is optionally formed by connecting two panels together to form a box section), rivets may be inserted from the outside surface of the sill through the pre-drilled holes on the outside wall of the section. The connection of the reinforcing section to both side walls of the sill stabilises the section within the sill and counters any tendency of the section to rotate under loading of the flange by a jack, particularly when the flange is offset laterally with respect to the inside wall of the sill, whereby vertical loading of the flange would apply a moment about an axis where a top edge of the inside section abuts the inside wall of the sill.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
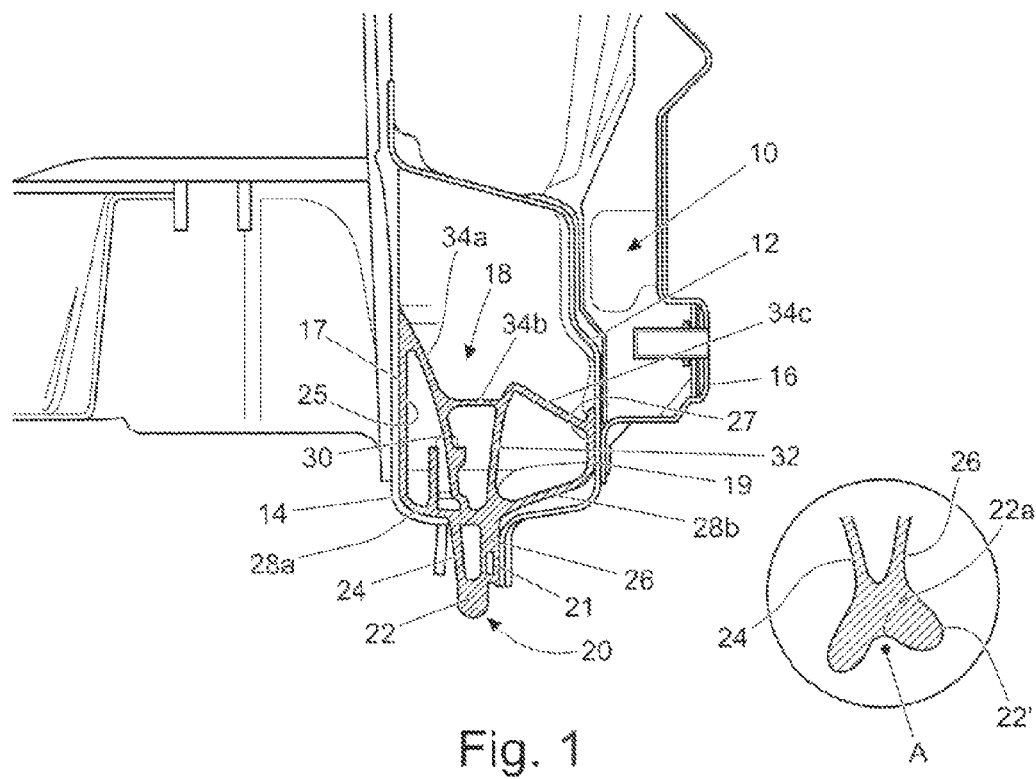
FIG. 1 is a section through the sill of a vehicle in accordance with an embodiment of the present invention and through an insert also in accordance with an embodiment of the present invention.
Figure 2:
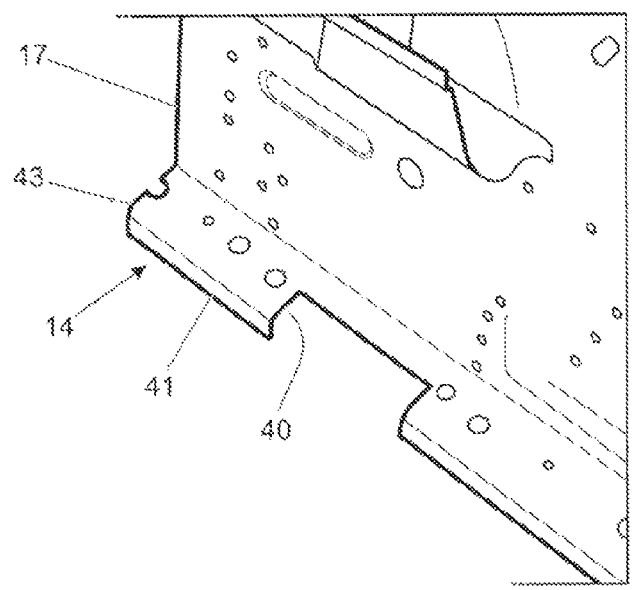
FIG. 2 is a perspective view of a body panel prior to assembly of the sill shown in FIG. 1.
Figure 4:
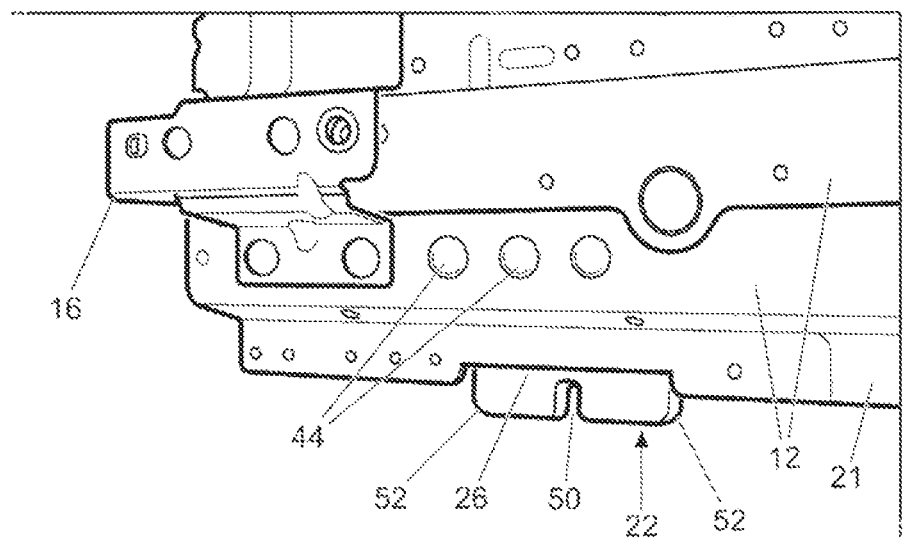
FIG. 4 is a side view of the assembled sill of FIG. 1.

FIG. 1 shows a sill 10 in section that comprises an outer sill panel 12 and an inner sill panel 14 that are connected together to form a box structure having side walls 17,19, the box structure providing rigidity and strength to the bottom side of a vehicle under its doors (not shown) and between its front and rear wheels (not shown). Side mount 16 is also shown (see FIG. 4, also) for connection of a side protector panel (not shown).

Sill panel 14 has a bottom flange 41 in its base wall 43 and in which is formed a slot 40. Bottom flange 41 is for connection of the outer sill panel 12 which likewise has a lower flange 21. Flanges 21,41 are typically interconnected by welding or riveting. The composite flange 21,41 is downwardly depending (with respect to the ground when the vehicle is assembled), primarily to allow water, that inevitably collects in the sill, to drain therefrom between the flanges, which may therefore be provided with folds (not referenced) at intervals along the length of the sill to provide escape conduits. However, the flange can, and often does, also provide a convenient jacking point for the vehicle. However, despite such a vehicle (as the present invention is primarily directed at) being constructed from lightweight materials, such as aluminium, nevertheless the vehicle can still be heavy resulting in the flange being required to absorb substantial load. Consequently, if is known to reinforce sills where a jacking point is desired, and in particular the downwardly depending flange. However, the requisite thickness in aluminium panels to support the required loading excludes simple solutions such as attaching an additional thickness of material in the flange area.

In the embodiment illustrated an aluminium extruded insert 18 is provided. The insert comprises inner and outer side walls 25,27, a floor wall, 28a,b and a roof or ceiling wall 34a,b,c. A depending flange 20 is provided, extending from the floor wall by two supporting flange walls 24,28 that terminate in a thickened, connecting nose 22. The flange walls extend directly beyond the floor walls 28a,b into fillets 30,32 that themselves transition into respective parts 34a and 34c of the roof wall 34a,b,c. The box section created by the side walls 25,27, the floor wall 28a,b and roof wall 34a,b,c is thus capable of being very strong, with the vehicle load applied to the nose 22 transitioning primarily along wall 24,30,34a into side wall 25. Indeed, in this embodiment, the box section is strengthened by fillet walls 30,32 that, in this case, connect the floor wall 28a,b with the roof wall 34a,b,c. The fillet walls could alternatively, or additionally, be between side walls 25,27.

To connect the insert 18 to the vehicle sill 10, elements of the section are machined away after extrusion to leave two L-shaped end extensions 70,78; 72,74 formed by extensions of the side wall 25 and floor wall 28a. These enable the insert to be connected to the sill panel 14, before it is connected to the outer sill panel 12, by self piercing rivets 78,80 passing through side wall 17 and floor wall 43 of the panel 14. Conveniently, at least the floor extensions 70,72 are also bonded to the floor wall 43 with adhesive at either side of a slot 40 formed in the flange 41 and floor wall of the sill panel 14. The slot 40 is formed to accommodate the depending flange 20, which is arranged to be deeper than the flanges 21,41, so that the nose 22 of the flange 20 is clearly evident and intended to provide a jacking point for the vehicle. To this end, three further features of the depending flange 22 are conveniently provided, any one or two of which may be omitted, if desired.

The first is a rounding of the nose 22, visible in the section of FIG. 1 and formed by the extrusion process. This enables the flange to rotate (about an axis perpendicular to the plane of the drawing and displaced significantly leftwardly of FIG. 1, (which is towards the other side of the vehicle of which the sill 10 forms a part)) on Jacking of the vehicle. At least, this occurs where the jacking plate (not shown) is a flat surface and the nose rolls on the plate as jacking progresses.

The second is a notch 50 that is machined in the flange 20/nose 22 whereby a transverse ridge (91, see inset to FIG. 3a) on the jacking plate 93 of a jack 100 can engage to prevent fore and aft movement of the vehicle with respect to the jacking plate during use and ensure correct location of the jack on the jacking point defined by the insert 18. Indeed, the ridge may form part (the cross piece 91) of an H-shaped dog 95 on the jacking plate 93, whose posts 97 of the H at either end of the cross piece 91 would be designed to lie on either side of the depending flange 20, and thus prevent any lateral movement of the flange 20 with respect to the jacking plate.

The third feature of the flange 20, that is also optionally provided, is rounded ends 52. These, like the notch 50, are also machined, not being feasibly provided by the extrusion process that forms the insert 18. The purpose of the rounded ends 52 is to deflect rock impacts and avoid damage to what would otherwise be exposed corners of the insert 18.

Figure 3A:
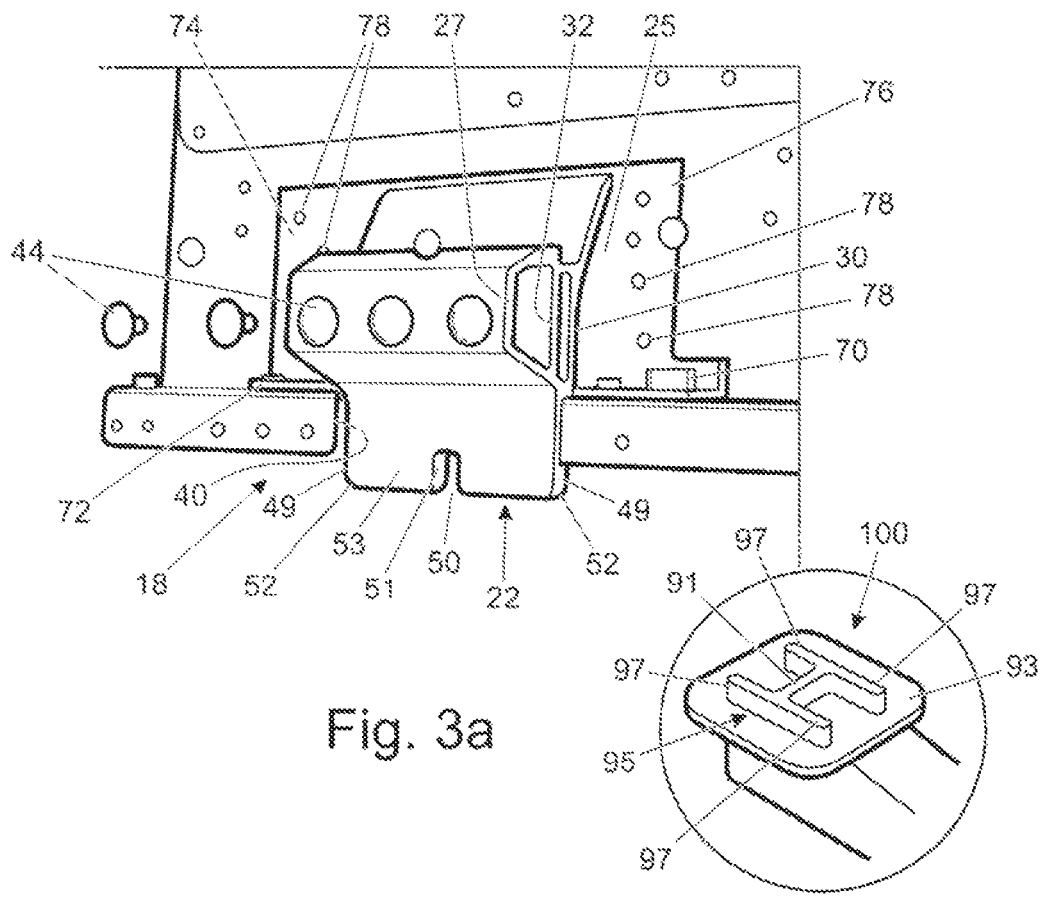
FIGS. 3a and b are side and elevated perspective views of the panel of FIG. 2 with the insert attached.
Figure 3B:
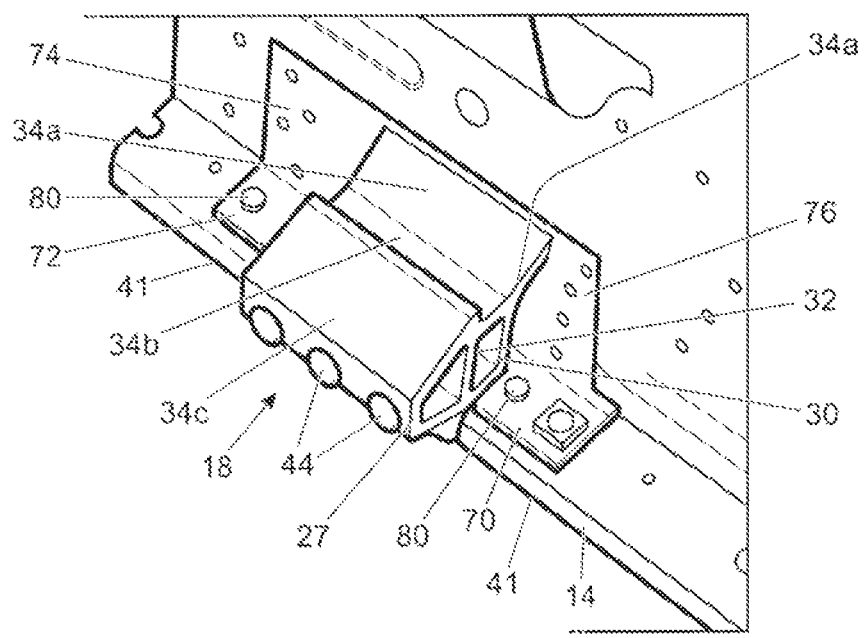

Means are optionally provided on the flange to positively engage the jack with respect to the vehicle, so as to prevent lateral movement of the flange with respect to the jack. These comprise, at a minimum, opposing vertical surfaces, that is to say, orthogonal surfaces with respect to the floor wall when in use, of the flange, that corresponding surfaces of the jack can engage. In FIG. 3a, such surfaces can be the side walls 53 of the flange 22 and/or the end walls 40 of the flange. Conveniently, each inside edge 51 of the notch 50 forms such opposing surfaces.

The opposing vertical surfaces 49,51,53 require components that are orthogonal with respect to each other, so that said prevention of lateral movement is omnidirectional in the horizontal plane. What this means is that the surfaces 51,53, are orthogonal, so that corresponding surfaces of a jack which engage them cannot move in any direction in a horizontal plane. Again, the notch 50 alone with an H-shaped flange on the jack serves this purpose, hut the invention is not limited to any specific arrangement.

By riveting, and optionally bonding, the base extensions 70,72 of the insert 18, to the lower wall 43 of the inner sill panel 14, the weakening effect, in the longitudinal direction, of the slot 40 on the sill 10 can be mitigated by the insert 13, so that no reduction in crash compaction resistance of the vehicle should be detected.

It is to be noted that, in this embodiment, the flange 22 itself is shorter than the total length of the insert 18 and this is also achieved by subsequent machining of the insert to remove the flange at its ends after extrusion. Of course, this feature is necessarily provided if the extensions 70,72 of the floor walls 28a are to have any function beyond enabling pierce riveting of the side extensions 74,76 and supporting such extensions.

After connection of the insert 18 to the inner sill wall 14, the assembly of the sill 10 can be completed by connection of the outer sill wall 12. The outer sill 12 wall may itself be formed of two components, but this has no relevance to the present invention. However, final completion of the jacking point is effected by blind riveting the outer panel 12 to the side wall 27 (which is pre-drilled with holes (not visible) for this purpose) with rivets 44.

Returning to FIG. 1, the orientation of the drawing is correct with respect to gravity and therefor upward forces, caused by gravitational reaction of the vehicle weight by the jack on the nose 22 are transferred, firstly through the wall 24 into the floor wall 28a and side wall 25, but also primarily through the fillet wall 30 and roof wall 34a into the side wall 25. If is for this reason that the walls 24,30,34a are gently and continuously curved towards the side wall 25 so that there are no concentrations of stress and the loads imposed by the jack are transferred smoothly to the inside wall of the section, and thence to the remainder of the vehicle. Thus the connection of the side wall (and floor wall 28) to the side sill panel 14 is of primary importance. However, it may be that the vehicle may not be on flat ground, and in any event the reaction of the jack changes direction slightly as jacking progresses, so that the force is not necessarily directly upwardly from the nose 22 between the walls 24,26, but may be inclined outwardly so as to impose a moment on the insert about an axis on or about the top edge of the side well 25. This moment is easily resisted, however, by the riveted connection of the side 19 to the outer sill wall 12.

It is also to be noted that the flange 22 is offset laterally with respect to the flanges 21,41 of the sill 10. This is preferred so that the jacking point is more directly under the side wall 17 of the sill 10, whereby there is less moment of the insert 18 and the primary loading of the insert on the sill is in its direction of maximum strength, namely in shear of the side wall 17. The flanges 21,41, on the other hand, are desirably equidistant the walls 17,19.

In an alternative arrangement of the nose 22, (which alternative is shown in the inset to FIG. 1 of the drawings) the flange nose 22' may be of female form. What this means is that the flange nose 22' may be in the form of an inverted Y-section, conveniently in which the crook 22a of the Y-section is curved about an axis A, outside and parallel the axis of the section of extrusion. This enables a jack head to be a simple rod (possibly a shallow U) that fits into the crook 22a.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless, the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An extruded aluminium section insert for insertion within a body structure of a vehicle and for use therein as a vehicle jacking point comprising:
 a side wall adapted to abut an internal side wall of a vehicle sill box structure in use;
 a floor wall connected to the side wall of the insert and adapted to abut a floor wall of the vehicle sill box structure in use;

a depending flange extending from the floor wall of the insert on an opposite side of the insert's floor wall as the connection to the insert's side wall;

wherein the depending flange is adapted to be engaged by a jack and transmit vehicle weight loads through the floor wall of the insert, into the side wall of the insert, and to the internal side wall of the vehicle sill box structure;

wherein the insert includes a second side wall, such that the side walls of the insert comprise an inside side wall and an outside side wall spaced apart from each other, the floor wall of the insert spanning a gap between the inside and outside side walls, and both the inside side wall and the outside side wall adapted to abut internal side walls of the vehicle sill box structure;

wherein the insert further comprises a ceiling wall spanning the gap between the inside and outside side walls; and wherein the insert further comprises one or more reinforcing fillet walls interconnecting either the floor and ceiling walls of the insert between the inside and outside side walls, or interconnecting the inside and outside side walls between the floor and ceiling walls of the insert.

2. A vehicle comprising a box structure sill on each side of the vehicle between front and rear wheels, wherein the box structure sill is reinforced by an extruded aluminium section insert, the extruded aluminium section insert being at least partially enclosed by the box structure sill and comprising a depending flange that extends through a slot in a floor wall of the box structure sill, whereby the depending flange provides at least one jacking point for the vehicle and the weight load of the vehicle is transmitted from the vehicle, through the box structure sill, into the extruded aluminium section insert and onto a jack through the depending flange, wherein the extruded aluminium section insert comprises:

a side wall adapted to abut an internal side wall of the box structure sill; and a floor wall connected to the side wall of the insert and adapted to abut the floor wall of the box structure sill;

wherein the depending flange extends from the floor wall of the insert on an opposite side of the insert's floor wall as the connection to the insert's side wall;

wherein the depending flange is adapted to be engaged by the jack and transmit vehicle weight loads through the floor wall of the insert, into the side wall of the insert, and to the internal side wall of the box structure sill;

wherein the extruded aluminium section insert includes a second side wall, such that the side walls of the insert comprise an inside side wall and an outside side wall spaced apart from each other, the floor wall of the insert spanning a gap between the inside and outside side walls, and both the inside side wall and the outside side wall adapted to abut internal side walls of the vehicle sill box structure;

wherein the extruded aluminium section insert includes a ceiling wall spanning the gap between the inside and outside side walls; and wherein the extruded aluminium section insert includes one or more reinforcing fillet walls interconnecting either the floor and ceiling walls of the insert between the inside and outside side walls, or interconnecting the inside and outside side walls between the floor and ceiling walls of the insert.

3. A vehicle comprising a box structure sill on each side of the vehicle between front and rear wheels, wherein the box structure sill is reinforced by an extruded aluminium section insert, the extruded aluminium section insert being at least partially enclosed by the box structure sill and comprising a depending flange that extends through a slot in a floor wall of the box structure sill, whereby the depending flange provides at least one jacking point for the vehicle and the weight load of the vehicle is transmitted from the vehicle, through the box structure sill, into the extruded aluminium section insert and onto a jack through the depending flange, in which inside and outside side walls of the extruded aluminium section insert are connected to internal side walls of the box structure sill whereby weight loads imposed by the jack on the extruded aluminium section insert are transmitted primarily into the internal side walls, in which the extruded aluminium section insert has at least one end extension that is a cantilevered extension of one of the inside and outside side walls, the extruded aluminium section insert being secured to the box structure sill by self-piercing rivets through the at least one end extension, in which, in cross-sectional profile, the depending flange comprises a nose at its extremity, in which the nose has two upstanding flange walls that diverge from each other until the upstanding flange walls meet a floor wall of the extruded aluminium section insert.

4. A vehicle as claimed in claim 3, in which the upstanding flange walls continue to diverge above the floor wall of the extruded aluminium section insert where the upstanding flange walls constitute fillet walls of the extruded aluminium section insert intermediate the inside and outside side walls.

5. A vehicle as claimed in claim 4, in which the fillet walls continue to diverge until an inside one of the fillet walls meets the inside side wall of the box structure sill, whereby loads imposed on the nose by the jack lifting the vehicle are transferred smoothly to the inside side wall of the extruded aluminium section insert, and thence to the remainder of the vehicle.

6. A vehicle as claimed in claim 5, in which a means to positively engage the jack comprises vertical surfaces with respect to the floor wall of the extruded aluminium section insert so that corresponding surfaces of the jack can engage the vertical surfaces and prevent lateral movement of the depending flange with respect to the jack.

7. A vehicle as claimed in claim 6, in which the vertical surfaces have components that are orthogonal with respect to each other, so that prevention of lateral movement is omnidirectional in a horizontal plane.

8. A vehicle as claimed in claim 3, wherein the nose of the depending flange is curved in cross-sectional profile.

9. A vehicle as claimed in claim 3, wherein the nose of the depending flange is of female form.

10. A vehicle as claimed in claim 9, wherein the nose of the depending flange is in the form of an inverted Y-section.

11. A vehicle as claimed in claim 10, wherein a crook of the inverted Y-section is curved.

12. A vehicle as claimed in claim 11 wherein a central notch is provided in the depending flange for cooperation with a dog provided on the jack, whereby omnidirectional location of the jack with respect to the depending flange is assured by engagement of the dog with the central notch.

13. A vehicle as claimed in claim 12, further including a jack having the dog, wherein the dog is H- or U-shaped with a cross of the H or U adapted to engage in the central notch.

14. A vehicle as claimed in claim 13, in which ends of the depending flange are rounded.

15. A vehicle as claimed in claim 14, in which the depending flange is offset laterally with respect to the inside side wall of the box structure sill.

* * * * *